US011091015B2

(12) United States Patent
Hirsch et al.

(10) Patent No.: US 11,091,015 B2
(45) Date of Patent: Aug. 17, 2021

(54) ACCUMULATOR ARRANGEMENT

(71) Applicant: Mahle International GmbH, Stuttgart (DE)

(72) Inventors: Stefan Hirsch, Stuttgart (DE); Michael Moser, Ellwangen (DE); Holger Schroth, Maulbronn (DE); Mario Wallisch, Aichtal (DE)

(73) Assignee: Mahle International GmbH

( * ) Notice: Subject to any disclaimer, the term of this patent is extended or adjusted under 35 U.S.C. 154(b) by 108 days.

(21) Appl. No.: 16/608,815

(22) PCT Filed: Apr. 10, 2018

(86) PCT No.: PCT/EP2018/059147
§ 371 (c)(1),
(2) Date: Oct. 25, 2019

(87) PCT Pub. No.: WO2018/197202
PCT Pub. Date: Nov. 1, 2018

(65) Prior Publication Data
US 2020/0189378 A1 Jun. 18, 2020

(30) Foreign Application Priority Data
Apr. 26, 2017 (DE) .......................... 102017206988.0

(51) Int. Cl.
*B60K 1/04* (2019.01)
*B62D 25/20* (2006.01)
*H01M 50/20* (2021.01)

(52) U.S. Cl.
CPC ............ *B60K 1/04* (2013.01); *B62D 25/2072* (2013.01); *H01M 50/20* (2021.01);
(Continued)

(58) Field of Classification Search
CPC ............. B60K 1/04; B60K 6/28; B62D 59/04
See application file for complete search history.

(56) References Cited

U.S. PATENT DOCUMENTS 5,501,289 A * 3/1996 Nishikawa ............ H01M 50/20
180/68.5
9,012,056 B2 * 4/2015 Lim ....................... H01M 50/20
429/120
(Continued)

FOREIGN PATENT DOCUMENTS

DE 102012000622 A1 7/2013
DE 102012012891 A1 1/2014
(Continued)

OTHER PUBLICATIONS

Machine English translation for DE-102014106949.
(Continued)

*Primary Examiner* — John D Walters
*Assistant Examiner* — James J Triggs
(74) *Attorney, Agent, or Firm* — Fishman Stewart PLLC

(57) ABSTRACT

An accumulator arrangement for a motor vehicle may include an accumulator housing, at least one transverse beam, and at least one battery module. The accumulator housing may include a first housing part and a second housing part, and may define a receiving space. The at least one transverse beam may be arranged on the accumulator housing and divide the receiving space at least partially into a first region and a second region. The at least one battery module may be arranged at least one of in the first region and in the second region. In a region of a connection site between the first housing part and the second housing part, the at least one transverse beam may include a positioning arrangement configured to provide a simplified and guided connecting of the first housing part with the second housing part.

20 Claims, 3 Drawing Sheets

(52) U.S. Cl.
CPC ...... *B60K 2001/0438* (2013.01); *B62D 25/20* (2013.01); *H01M 2220/20* (2013.01)

(56) References Cited

U.S. PATENT DOCUMENTS

| | | | |
|---|---|---|---|
| 9,748,538 B2* | 8/2017 | Fritz | B60L 58/21 |
| 9,929,389 B2* | 3/2018 | Klimek | B60K 1/04 |
| 10,476,117 B2* | 11/2019 | Ito | B60L 50/66 |
| 2012/0181981 A1 | 7/2012 | Wechlin et al. | |
| 2014/0284125 A1* | 9/2014 | Katayama | B60L 50/64 |
| | | | 180/68.5 |
| 2019/0131602 A1* | 5/2019 | Hilfrich | H01M 50/20 |

FOREIGN PATENT DOCUMENTS

| | | |
|---|---|---|
| DE | 102012015818 A1 | 2/2014 |
| DE | 102014106949 A1 | 11/2015 |
| DE | 102015204841 A1 | 9/2016 |
| DE | 102015111749 A1 | 1/2017 |
| DE | 102016110330 A1 | 12/2017 |
| DE | 102016212273 A1 | 1/2018 |
| EP | 2026404 A1 | 2/2009 |
| EP | 2072308 A2 | 6/2009 |
| EP | 2620353 A1 | 7/2013 |
| EP | 2620960 A1 | 7/2013 |
| EP | 2712006 A1 | 3/2014 |
| EP | 2741343 A1 | 6/2014 |
| EP | 2858079 A1 | 4/2015 |
| EP | 2871123 A1 | 5/2015 |
| EP | 3125357 A1 | 2/2017 |
| FR | 2993511 A1 | 1/2014 |
| GB | 2529630 A | 3/2016 |
| KP | 1020160019898 A | 2/2016 |
| WO | 2010/136863 A1 | 12/2010 |
| WO | 2015014827 A2 | 2/2015 |
| WO | 2016088476 A1 | 6/2016 |

OTHER PUBLICATIONS

English abstract for FR-2993511.
English translation of IPRP dated Oct. 31, 2019 for copending International Application No. PCT/EP2018/059147.
English translation of IPRP dated Oct. 31, 2019 for copending International Application No. PCT/EP2018/059166.
English translation of IPRP dated Oct. 31, 2019 for copending International Application No. PCT/EP2018/059777.
English translation of IPRP dated Oct. 31, 2019 for copending International Application No. PCT/EP2018/059779.
Machine English translation of KR1020160019898A.
Machine English translation for DE102016212273A1.
Machine English translation for DE102015204841A1.
English abstract for DE-102012000622.
English abstract for DE-102012012891.

* cited by examiner

ACCUMULATOR ARRANGEMENT

CROSS-REFERENCE TO RELATED APPLICATIONS

This application claims priority to International Patent Application No. PCT/EP2018/059147, filed on Apr. 10, 2018, and German Patent Application No. DE 10 2017 206 988.0, filed on Apr. 26, 2017, the contents of both of which are hereby incorporated by reference in their entirety.

TECHNICAL FIELD

The present invention relates to an accumulator arrangement, in particular for a motor vehicle, with an accumulator housing having a first housing part and a second housing part, which accumulator housing has a receiving space for receiving at least one battery module.

BACKGROUND

In today's electrically operated motor vehicles, so-called traction batteries come into use for the storage of electrical energy. The traction batteries are often formed from several battery modules connected electrically with one another, which are arranged in a preferably sealed accumulator housing provided for this. These accumulator housings serve to protect the electronics from external influences and generally consist of a housing upper shell and a housing lower shell. Generally, such accumulator housings have a high requirement in particular with regard to tightness, owing to the in part very high voltages of the individual battery modules. An exchange of such battery modules meanwhile constitutes a great installation effort, because generally the battery modules per se have to be dismantled together with the accumulator housing, in order to be able to open said accumulator housing at all.

From DE 10 2012 012 891 A1 a device is generally known for the connecting of at least two battery modules, arranged in at least one row, in a battery box of a vehicle, which battery modules adjoin one another with interposition of a connection plate. For this, the connection plate has centring elements on a module side, which project in corresponding centring openings of the battery modules which adjoin one another. Furthermore, in particular on the opposite module side, a connection element is provided, uncoupled functionally from the connection plate, which connection element connects the two adjoining battery modules with one another on the opposite module side. The battery box, formed of an upper shell and a lower shell, dips here into a centre tunnel of a vehicle body floor.

It is disadvantageous in the present prior art on the one hand that for example for the maintenance of individual battery modules generally the entire traction battery, i.e. the entire accumulator housing, including the battery modules arranged therein, has to be dismantled. As the traction batteries are relatively large and are very heavy, the effort for the mounting and dismantling is extremely laborious and, in addition, cost-intensive. On the other hand, the current accumulator housings are not at all, or only to a very limited extent, of use for increasing the structural strength of the vehicle body as such. Known constructions use a separate battery housing, which owing to transport regulations must itself have a certain strength. The strength characteristic of the battery housing is combined, on mounting, with the strength of the vehicle body. This requires a great effort of coordination between the two technical groups and leads to excessive requirements for separate battery housings. Furthermore, the needed strength requirements with regard to the battery housing for a use of the battery after the life cycle in the vehicle for example as a buffer store are excessive and unnecessary.

SUMMARY

The present invention is therefore concerned with the problem of indicating for an accumulator arrangement of the type named in the introduction an improved or at least alternative embodiment, which in particular at least partly overcomes the above-mentioned disadvantages and, in addition, is able to be produced at a favourable cost by a simplified manufacture.

This problem is solved according to the invention by the subject of the independent claim(s). Advantageous embodiments are the subject of the dependent claim(s).

The present invention is based on the general idea of arranging, in an accumulator arrangement with an accumulator housing having a first housing part and a second housing part, at least one transverse beam in a receiving space of the accumulator housing, in order to increase a structural strength of a vehicle body. Essentially, the accumulator housing is configured, through the configuration with the first housing part and the second housing part, so as to be able to be divided or respectively dismantled in Z direction. This configuration makes possible a simplified mounting and dismantling of the at least one battery module which is provided. Along a longitudinal axis of the transverse beam, for example in Y direction of the motor vehicle, by arrangement of the at least one transverse beam an increased torsional rigidity can be achieved. In addition, the bending rigidity can be increased for example around a motor vehicle longitudinal axis, therefore around the X axis of the motor vehicle, through the arrangement of the transverse beam according to the invention. The accumulator arrangement according to the invention has, for this, the accumulator housing formed from the first housing part and the second housing part, which accumulator housing delimits such a receiving space for the receiving of the at least one battery module. The at least one transverse beam arranged on the accumulator housing divides the receiving space at least partially into a first region and a second region. Provision is made that at least one such battery module is arranged in the first region or in the second region in the receiving space. It is to be stated that any desired number of transverse beams can come into use in the receiving space of the accumulator housing, whereby any desired number of at least partly divided regions can be formed.

In an advantageous embodiment of the idea according to the invention, the at least one transverse beam is formed partly integrally on the first housing part and/or integrally on the second housing part. The at least one transverse beam is therefore to be understood as a part of the entire accumulator housing. The integral configuration of the transverse beam structure is advantageous from the point of view of manufacturing technique and technical cost.

An advantageous further development makes provision that the transverse beam has at least one shoulder on which the at least one battery module rests. The shoulder on the transverse beam preferably extends in Y direction of the motor vehicle, so that a battery module, shaped in a corresponding manner to the shoulder, preferably has a thickening formed in the region of the shoulder, which rests against the shoulder. The thickening, formed in the Y direction of the motor vehicle, on the battery module can therefore be clamped between the accumulator housing which is able to be divided in the Z direction of the motor vehicle, whereby the battery module can be fixed.

In an expedient embodiment, the shoulder is formed on a side facing the first housing part or on a side facing the second housing part, and the at least one battery module is clamped between the first housing part and/or the second housing part and the transverse beam. This means that the shoulder makes it possible to clamp the at least one battery module between the first housing part and the second housing part, so that a force fit in Z direction and a form fit, which is preferably subject to tolerance, in at least the X direction, arise.

A further advantageous embodiment makes provision that the transverse beam has a positioning arrangement in the region of the connection site between the first housing part and the second housing part. The positioning arrangement serves primarily for a simplified and guided connecting of the first housing part with the second housing part of the accumulator housing. Furthermore, the positioning arrangement serves for the partial fixing of the two housing parts to one another in the X direction of the motor vehicle and in the Y direction of the motor vehicle.

In an advantageous embodiment, the transverse beam is formed from a first transverse beam part and a second transverse beam part, wherein the first transverse beam part is formed on the first housing part and the second transverse beam part is formed on the second housing part. The first transverse beam part and/or the second transverse beam part can be formed respectively integrally on the first housing part or respectively on the second housing part. Particularly preferably, the previously described shoulder is arranged in the region of the connection of the two transverse beam parts. Furthermore, the positioning arrangement is preferably arranged as a connection member between the respective first transverse beam part and the respective second transverse beam part of such a transverse beam.

An advantageous further development makes provision that the positioning arrangement is formed as a toothing, wherein the transverse beam has, at least on one side, tooth elements which engage into receiving elements, corresponding thereto, on the first housing part or on the second housing part. By means of the positioning arrangement, a fixing of the first housing part to the second housing part is provided both in the X direction of the motor vehicle and also in the Y direction of the motor vehicle.

In an expedient embodiment, the first housing part and the second housing part are fixed to one another by means of a holding device in the region of the at least one transverse beam. A fixing of the two housing parts in the region of the at least one transverse beam by means of a holding device increases the structural rigidity of the entire accumulator housing.

In an advantageous embodiment, the holding device is formed as a screw connection. Here, expediently for example either the first housing part or the second housing part has a thread which is formed in a complementary manner to a screw which screws the two housing parts to one another.

In an advantageous variant embodiment of the idea according to the invention, the screw of the screw connection at least partially penetrates the transverse beam in Z direction. The fixing of the two housing parts of the accumulator housing in the region of the at least one transverse beam constitutes a solution which is optimized with regard to installation space.

An advantageous further development of the invention makes provision that the at least one transverse beam is connected at its respectively longitudinal ends by means of a C-shaped profile in the mounting state on both sides on respectively longitudinal beams of the motor vehicle. Through the arrangement of the C-shaped profiles on both sides, torsion- and bending forces, on the one hand, can be transferred on the respective longitudinal beams and, on the other hand, differences in length of the transverse beams, due to manufacture, can be compensated or respectively adjusted via the C-shaped profiles.

In an expedient embodiment, the C-shaped profiles are produced from a material having a lower strength than the at least one transverse beam. Through the advantageous selection of different materials with different strength characteristics, a lateral impact energy can be advantageously compensated. Through the fact that the C-shaped profiles have a lower strength than the transverse beams, the C-shaped profiles deform more than the transverse beams in the case of an application of force in the Y direction of the motor vehicle, whereby the battery modules are protected.

An advantageous embodiment makes provision that the first housing part and/or the second housing part are sealed by means of a sealing material. The accumulator housing and the at least one transverse beam arranged on this accumulator housing can consist of several individual parts, which are partly for example only welded to one another at selective points. In accordance with the requirement for a tight accumulator housing, a seal of the first housing part and/or of the second housing part by means of a sealing material is provided. For example, the first housing part and/or the second housing part can be acted upon or respectively sprayed with an adhesive.

Expediently, a sealing contour is provided between the first housing part and the second housing part. The sealing serves substantially for the protection of the electronics in the region of the receiving space. The arrangement of a circumferential ring seal constitutes a favourably priced and effective sealing of the electronics which are to be protected.

In an advantageous embodiment, the sealing contour comprises a double sealing line and is formed as a closed circumferential ring seal. The configuration of the double sealing line has the advantage that the tightness between the first housing part and the second housing part can be ascertained by a testing of the space between the two sealing lines.

A motor vehicle according to the invention has such a previously described accumulator arrangement. Here, a motor vehicle underride protection can be formed in one piece or respectively monolithically with either the first housing part or with the second housing part of the accumulator housing. Therefore, the motor vehicle underride protection constitutes at the same time the housing lower shell of the accumulator housing, so that an otherwise usual additional separate protective cover can be dispensed with entirely. Alternatively or additionally, either the first housing part or the second housing part can be formed in one piece or respectively monolithically with a vehicle underbody of the motor vehicle. Therefore, the vehicle underbody of the motor vehicle constitutes at the same time the housing upper shell, so that an otherwise usual additional separate part can be dispensed with.

Advantageously, provision can also be made that the at least one battery module is detachably secured directly on the first housing part or on the second housing part. "Directly secured" means, in this context, that the at least one battery module is able to be secured in the one housing part without the other housing part and is able to be detached therefrom. The at least one battery module can be secured on the first housing part or on the second housing part for example in a clamping or form-fitting manner or by another detachable connection. Therefore, several battery modules can be secured individually directly on the vehicle underbody or on the first housing part secured to the vehicle underbody, and detached therefrom. If, for example, the first housing part is mounted on the vehicle underbody, then the battery module which is secured to the first housing part is able to be reached for a maintenance without a dismantling of the first housing part from the vehicle underbody, and is able to be detached therefrom. In this advantageous manner, the maintenance and the dismantling of the at least one battery module in the accumulator arrangement can be simplified.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
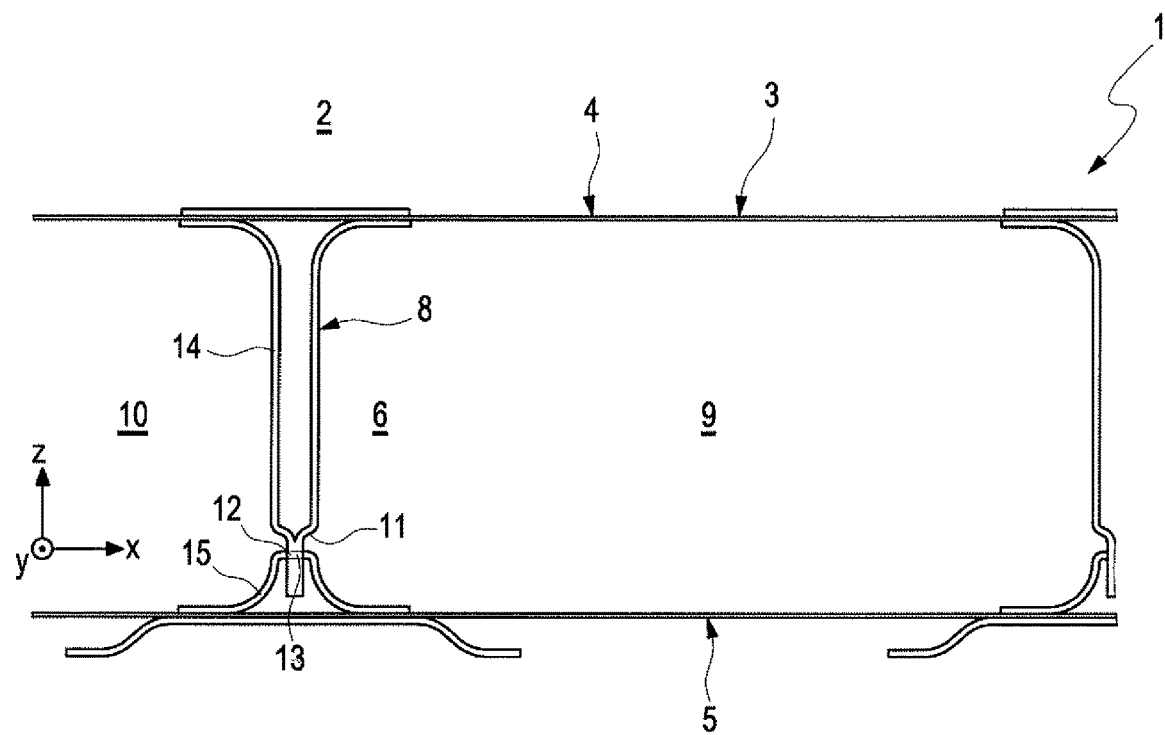
FIG. 1 a sectional illustration of an accumulator arrangement according to the invention, with an accumulator housing having a first housing part and a second housing part, FIG. 2 the illustration of FIG. 1 with a battery module inserted into a receiving space delimited by the accumulator housing, FIG. 3 the illustration of FIG. 2, wherein the second housing part is illustrated spaced apart from the first housing part in the Z direction of the motor vehicle, FIG. 4 an isometric detail illustration of the accumulator arrangement in the region of a transverse beam, FIG. 5 the illustration of FIG. 2, wherein the first housing part and the second housing part are fixed to one another by a holding device, FIG. 6 a schematic diagram of the transverse beam in the mounting state with C-shaped profiles arranged on both sides, which are arranged respectively on longitudinal beams of a motor vehicle, FIG. 7 the illustration of FIG. 6 in the deformed state after an application of force in the Y direction of the motor vehicle.

FIG. 1 shows a sectional illustration of an accumulator arrangement 1 according to the invention with an accumulator housing 3 having a first housing part 4 and a second housing part 5. The accumulator arrangement 1 is provided in particular for a motor vehicle 2 which is not illustrated in further detail. The accumulator housing 3 surrounds or respectively delimits a receiving space 6, which is formed for the receiving of at least one battery module 7, which is not shown here. A transverse beam 8 is arranged on the accumulator housing 3, which transverse beam divides the receiving space 6 into a first region 9 and a second region 10. The accumulator arrangement 1 can have any desired number of transverse beams 8 and therefore any desired number of regions 9, 10 delimited by the respective transverse beams 8. The respective regions 9, 10 preferably have, in a mounted state of the accumulator housing 3, a closed contour in cross-section. The contour of the respective regions 9, 10 can preferably have the shape of a rectangle with rounded corners. Through the previously described advantageous configuration of the contour of the respective regions 9, 10, an increased torsional rigidity can be made possible along a Y axis of the motor vehicle. The at least one transverse beam 8 can have an I-shaped configuration, whereby an increased bending rigidity can be made possible around the X axis of the motor vehicle. Moreover, the transverse beam 8 can be formed partially integrally on the first housing part 4 and/or partially integrally on the second housing part 5. It is to be stated that both the transverse beam(s) 8 and also the contour of the respective regions 9, 10 can have all conceivable shapes. It is only essential that by arrangement of the at least one transverse beam 8 on the accumulator housing 3, the receiving space 6 is divided at least into two or more regions 9, 10.

Figure 2:
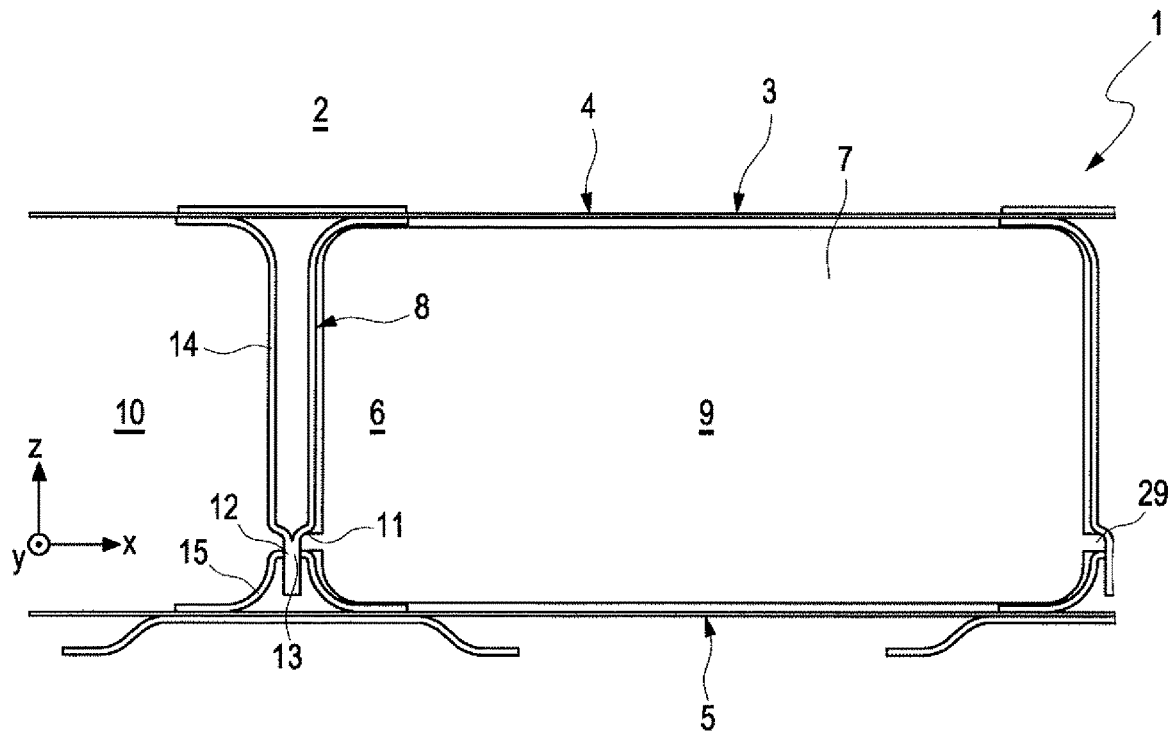

FIG. 2 shows the illustration of FIG. 1 with a battery module 7 inserted into the receiving space 6 of the accumulator housing 3. As already described previously, the receiving space 6 is divided into the first region 9 and the second region 10 through the arrangement of the transverse beam 8. It can be seen from the illustration that the battery module 7 is inserted in the first region 9. The second region 10, on the other hand, is free or respectively is not equipped with such a battery module 7. The at least one battery module 7 can be formed from a collection of Li-ion cells. The at least one transverse beam 8 can preferably be embodied so as to be particularly narrow, so that adjacent battery modules 7 in the X direction of the motor vehicle have as small a distance as possible from one another. This configuration can make possible as optimum a utilization of installation space of the accumulator arrangement 1 as possible with regard to a plurality of battery modules 7. Furthermore, the I-shaped construction of the transverse beam 8 can enable apertures in the X direction of the motor vehicle with only a small loss of bending rigidity. Such a battery module 7, in the mounting state, is delimited by the first housing part 4 and the second housing part 5 in the Z direction of the motor vehicle. In the X direction of the motor vehicle, such a battery module 7 adjoins such a transverse beam 8 at least on one side or even on both sides.

Furthermore, the at least one transverse beam 8 can have a shoulder 11, against which the at least one battery module 7 can rest or respectively be clamped. The shoulder 11 can be arranged in the region of a connection site 12 in the Z direction of the motor vehicle between the first housing part 4 and the second housing part 5.

Figure 3:
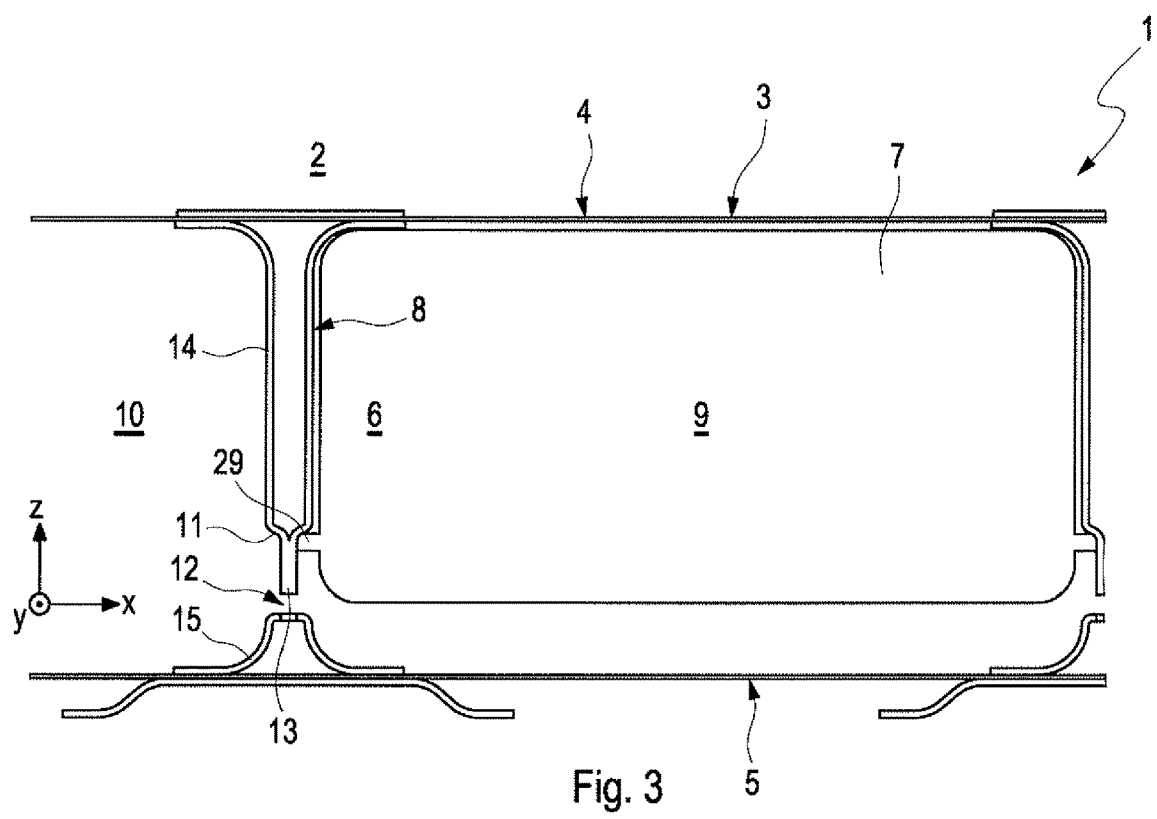

FIG. 3 shows the illustration of FIG. 2, wherein the second housing part 5 is illustrated spaced apart or respectively detached from the first housing part 4 in the Z direction of the motor vehicle. The accumulator housing 3 can be expediently configured so that it is able to be divided horizontally, therefore in the Z direction of the motor vehicle, so that the at least one battery module 7 can be mounted in the interior of the accumulator housing 3 and dismantled. The shoulder 11 can be formed on a side facing the first housing part 4 or on a side facing the second housing part 5. The at least one battery module 7 can be clamped in the region of the shoulder 11 between the first housing part 4 and/or the second housing part 5 and the transverse beam 8. For this, the battery module 7 can have, for example, a bead-like thickening 29, which extends into the region of the shoulder 11. The bead-like thickening 29 of the battery module 7 can be clamped in the region of the connection site 12 in the Z direction of the motor vehicle between the first housing part 4 and the second housing part 5.

Moreover, the transverse beam 8 can have a positioning arrangement 13 in the region of the connection site 12 between the first housing part 4 and the second housing part 5. Here, the transverse beam 8 can be formed from a first transverse beam part 14 and a second transverse beam part 15. The first transverse beam part 14 can be arranged for example on the first housing part 4, whereas the second transverse beam part 15 can be arranged on the second housing part 5. The first transverse beam part 14 and the second transverse beam part 15 can be formed respectively integrally on the first housing part 4 or on the second housing part 5.

Figure 4:
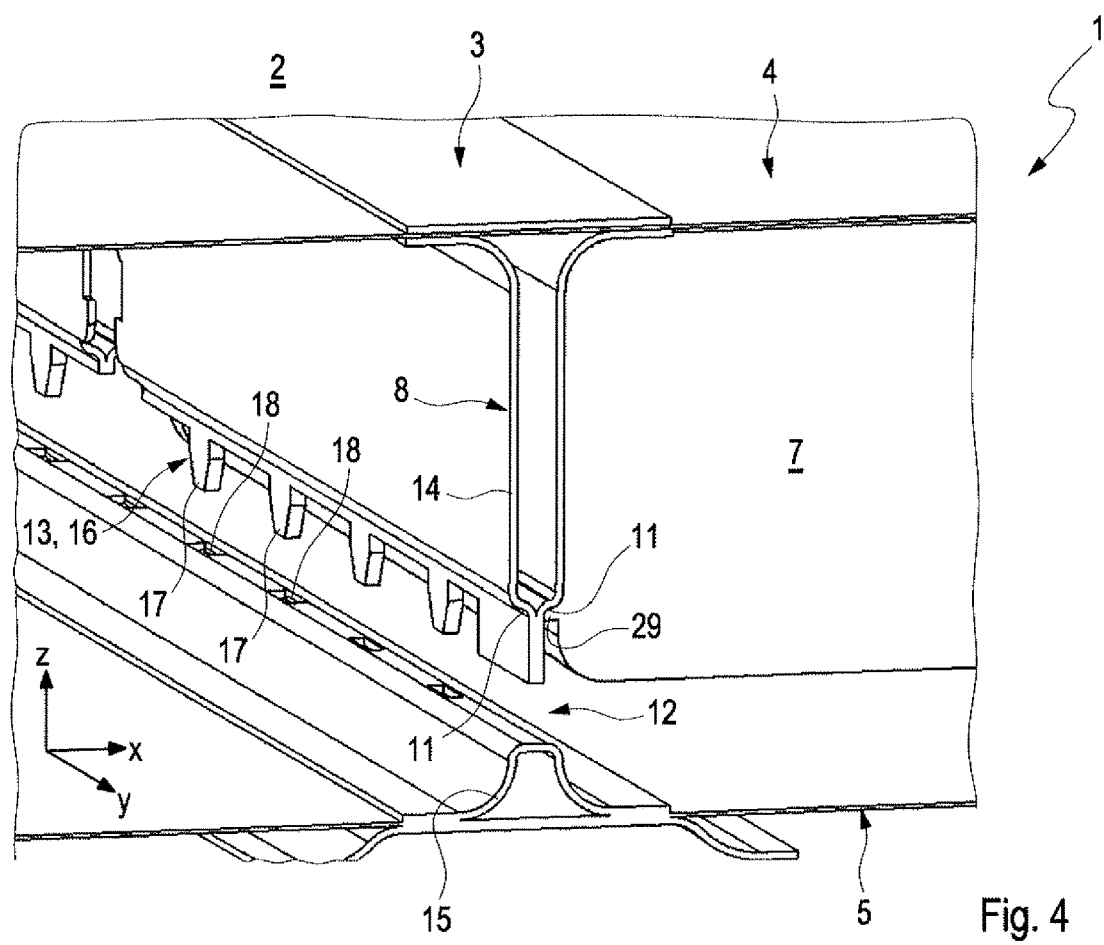

FIG. 4 shows an isometric detail illustration of the accumulator arrangement 1 in the region of the transverse beam 8. In particular, the detail illustration shows the region of the connection site 12 between the first housing part 4 and the second housing part 5, or respectively the connection site 12 between the first transverse beam part 14 and the second transverse beam part 15, or respectively the connection site 12 between the transverse beam 8 as such and the first housing part 4 or the second housing part 5. Hereinafter, for the sake of simplicity, one proceeds from a configuration of the accumulator arrangement 1 in which the transverse beam 8 is arranged integrally on the first housing part 4 and the connection site 12 for completion of the accumulator housing 3 lies between the transverse beam 8 and the second housing part 5. In the said region of the connection site 12, the positioning arrangement 13 is arranged. The positioning arrangement 13 can be, as shown, formed as a toothing 16, wherein the transverse beam 8 can have at least one tooth element 17 which can engage into at least one receiving element 18, corresponding thereto, on the second housing part 5. Expediently, the toothing 16 can have several tooth elements 17 and several receiving elements 18 corresponding thereto. Basically, the positioning arrangement 13 can have any shape which makes it possible to at least partially position or even to fix the second housing half 5 to the first housing half 4 in the X direction of the motor vehicle and/or in the Y direction of the motor vehicle and/or in the Z direction of the motor vehicle.

Figure 5:
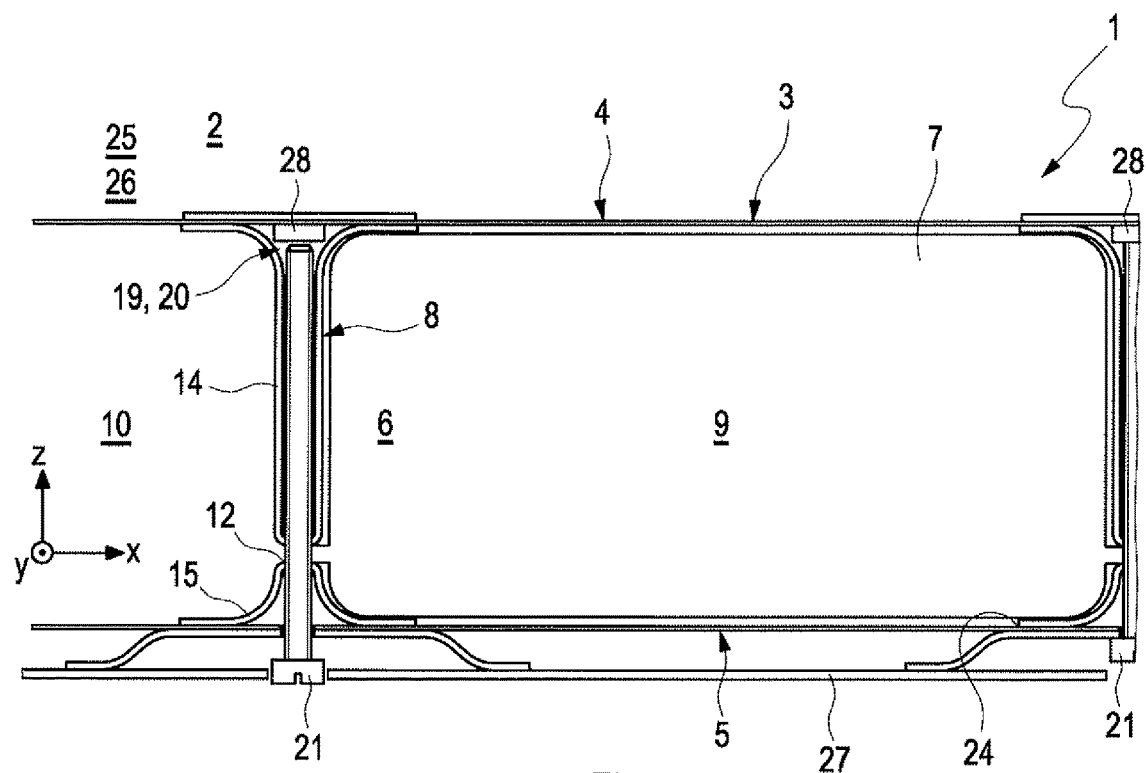

FIG. 5 shows again the illustration of FIG. 2, wherein the first housing part 4 and the second housing part 5 are fixed to one another by a holding device 19. The holding device 19 can be arranged in the region of the transverse beam 8. Furthermore, the holding device 19 can be formed as a screw connection 21. Within the scope of the invention, however, all conceivable holding devices 19 are protected, which serve for the fixing of the two housing parts 4, 5 of the accumulator housing 3. In the exemplary embodiment, in which the holding device 19 is formed as a screw connection 20, a screw 21 can at least partially penetrate such a transverse beam 8 in the Z direction of the motor vehicle. In the example which is shown, the screw 21 can be screwed through the second housing part 5 and brought into operative connection further through the transverse beam 8 with a thread 28, provided on the first housing part 4, which thread is arranged on a side on the first housing part 4 facing the second housing part 5.

The entire accumulator housing 3 with the at least one transverse beam 8 arranged thereon can be made from several individual parts, which are partly connected with one another only by weld spots or by permeable weld seams. In this respect, a sealing material 24 can be provided on the respective boundary surfaces. In particular, the first housing part 4 and/or the second housing part 5 can be sealed by means of the sealing material 24. Furthermore, the horizontal connection sites 12, therefore in the Z direction of the motor vehicle, can have a sealing contour 25, not shown in further detail, between the first housing part 4 and the second housing part 5. The sealing contour 25 can comprise a double sealing line and can be formed as a closed circumferential ring seal 26. By arrangement of the circumferential ring seal 26, the at least one battery module 7 in the interior of the accumulator housing 3 can be protected from external environmental influences.

In addition to the second housing part 5, a so-called motor vehicle underride protection 27 can be arranged on a motor vehicle floor. Provided that the second housing part 5 is arranged on the vehicle floor and not the first housing part 4, this motor vehicle underride protection 27 can be in contact with the second housing part 5 or respectively can be securely connected therewith. Likewise, depending on which of the two housing parts 4, 5 is aligned on the vehicle floor, it can be that the motor vehicle underride protection 27 is formed in one piece or respectively monolithically with the second housing part 5 or with the first housing part 4.

Figure 6:
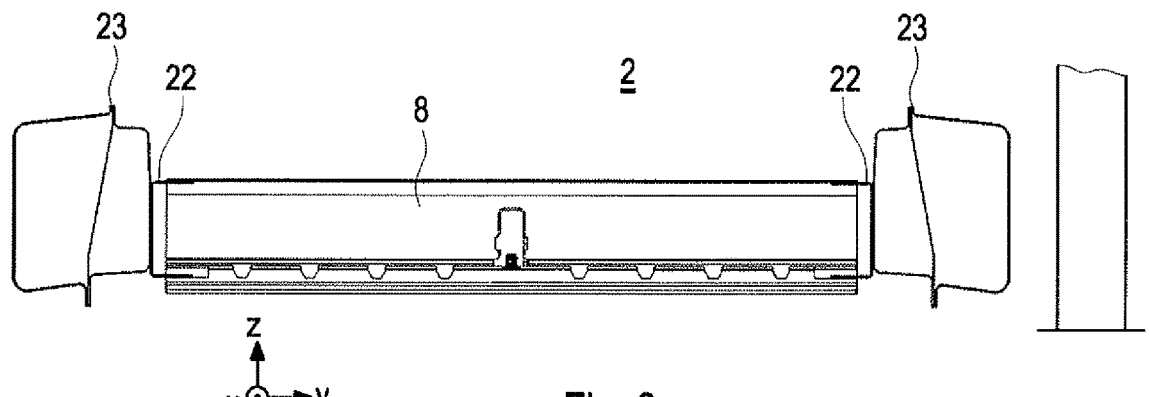
Figure 7:
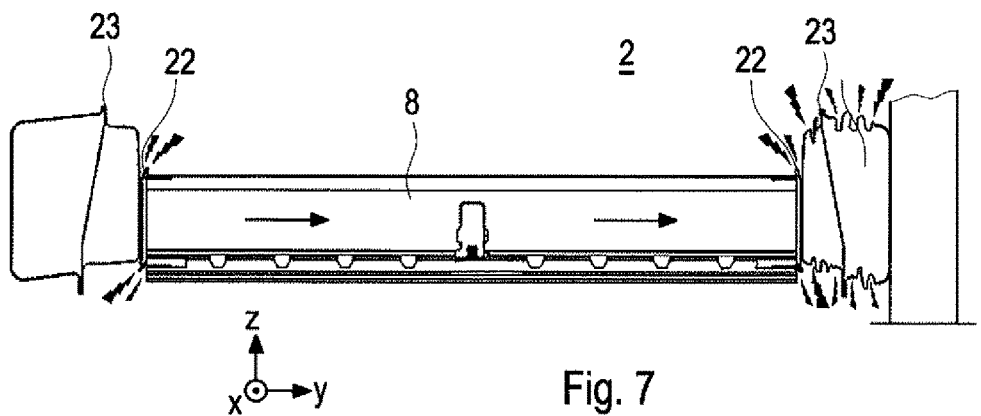

FIG. 6 and FIG. 7 show respectively schematic diagrams of the transverse beam 8 according to the invention with C-shaped profiles 22 arranged on both sides, which are respectively arranged on longitudinal beams 23 of the motor vehicle 2 in different states. FIG. 6 shows the transverse beam 8 in a mounting state, whereas FIG. 7 shows the transverse beam 8 in a state deformed by an application of a force in the Y direction of the motor vehicle. By the C-shaped configuration of the profiles 22, torsion- and bending forces can be transferred to the respective longitudinal beam 23 and differences in length, due to manufacture, of at least two transverse beams 8 according to the invention can be compensated. The C-shaped profiles 22 can be configured in such a way that these preferably have a lower strength than the at least one transverse beam 8 of the accumulator housing 3 or respectively the entire accumulator housing 3 as such. In the case of a lateral impact of the motor vehicle 2, to that effect firstly the C-shaped profiles 22 deform, whereby the impact energy can be reduced before it acts on at least one transverse beam 8 or respectively on the entire accumulator housing 3 as such and deforms respectively these latter.

The invention claimed is:

1. An accumulator arrangement for a motor vehicle, comprising:
    an accumulator housing including a first housing part and a second housing part, and defining a receiving space for receiving at least one battery module;
    the accumulator housing dividable via the first housing part and the second housing part in a Z direction of the motor vehicle, at least one of the first housing part and the second housing part configured for arranging the accumulator housing on a vehicle underbody of the motor vehicle;
    at least one transverse beam arranged on the accumulator housing and dividing the receiving space at least partially into a first region and a second region;
    at least one battery module arranged at least one of in the first region and in the second region; and
    wherein, in a region of a connection site between the first housing part and the second housing part, the at least one transverse beam includes a positioning arrangement configured to provide a guided connecting of the first housing part with the second housing part.

2. The accumulator arrangement according to claim 1, wherein the at least one transverse beam is provided partially integrally on at least one of the first housing part and the second housing part.

3. The accumulator arrangement according to claim 1, wherein the at least one transverse beam has at least one shoulder, and wherein the at least one battery module rests against the at least one shoulder.

4. The accumulator arrangement according to claim 3, wherein:
the at least one shoulder is disposed on one of (i) a side of the at least one transverse beam facing the first housing part and (ii) a side of the at least one transverse beam facing the second housing part; and
the at least one battery module is clamped between (i) at least one of the first housing part and the second housing part and (ii) the at least one transverse beam.

5. The accumulator arrangement according to claim 1, wherein:
the at least one transverse beam is defined by a first transverse beam part and a second transverse beam part; and
the first transverse beam part is formed on the first housing part and the second transverse beam part is formed on the second housing part.

6. The accumulator arrangement according to claim 1, wherein:
the positioning arrangement is structured as a toothing;
the at least one transverse beam includes a plurality of tooth elements disposed on at least one side, the plurality of tooth elements engaging in a plurality of receiving elements corresponding thereto; and
the plurality of receiving elements are disposed at least one of on the first housing part and on the second housing part.

7. The accumulator arrangement according to claim 1, wherein the first housing part and the second housing part are secured to one another via a holding mechanism in a region of the at least one transverse beam.

8. The accumulator arrangement according to claim 7, wherein the holding mechanism is structured as a screw connection.

9. The accumulator arrangement according to claim 8, wherein a screw of the screw connection at least partially penetrates the at least one transverse beam in the Z direction.

10. The accumulator arrangement according to claim 1, wherein the at least one transverse beam has at least two longitudinal ends and, in a mounting state, the at least two longitudinal ends are respectively connected via a C-shaped profile of a plurality of C-shaped profiles with a respective longitudinal beam of the motor vehicle.

11. The accumulator arrangement according to claim 10, wherein the plurality of C-shaped profiles are composed of a material having a lower strength than a second material from which the at least one transverse beam is composed.

12. The accumulator arrangement according to claim 1, wherein at least one of the first housing part and the second housing part are sealed via a sealing material.

13. The accumulator arrangement according to claim 1, further comprising a sealing contour arranged between the first housing part and the second housing part.

14. The accumulator housing according to claim 13, wherein the sealing contour includes a double sealing line and is structured as a closed circumferential ring seal.

15. A motor vehicle comprising an accumulator arrangement according to claim 1.

16. The motor vehicle according to claim 15, wherein at least one of:
at least one of the first housing part and the second housing part is at least one of (i) integrally provided as a single piece with a motor vehicle underride protection and (ii) structured monolithically with the motor vehicle underride protection; and
at least one of the first housing part and the second housing part is at least one of (i) integrally provided as a single piece with the vehicle underbody and (ii) structured monolithically with the vehicle underbody.

17. The motor vehicle according to claim 15, wherein the at least one battery module is detachably secured directly on at least one of the first housing part and the second housing part.

18. An accumulator arrangement for a motor vehicle, comprising:
an accumulator housing including a first housing part and a second housing part, and defining a receiving space;
the accumulator housing dividable in a Z direction of the motor vehicle via the first housing part and the second housing part
the accumulator housing securable on a vehicle underbody of the motor vehicle via at least one of the first housing part and the second housing part;
at least one transverse beam arranged on the accumulator housing and dividing the receiving space at least partially into a first region and a second region;
at least one battery module arranged at least one of in the first region and in the second region;
a positioning arrangement disposed in a region of a connection site between the first housing part and the second housing part, the positioning arrangement facilitating alignment and connection of the first housing part and the second housing part; and
wherein the positioning arrangement includes a plurality of tooth elements and a plurality of receiving elements configured to receive the plurality of tooth elements; and
wherein the plurality of tooth elements are arranged on the at least one transverse beam, and the plurality of receiving elements are structured and arranged in a complimentary manner to the plurality of tooth elements on at least one of the first housing part and the second housing part.

19. An accumulator arrangement for a motor vehicle, comprising:
an accumulator housing including a first housing part and a second housing part, and defining a receiving space;
the accumulator housing dividable in a Z direction of the motor vehicle via the first housing part and the second housing part;
the accumulator housing securable on a vehicle underbody of the motor vehicle via at least one of the first housing part and the second housing part;
the first housing part including a first transverse beam part, and the second housing part including a second transverse beam part;
the first transverse beam part and the second transverse beam part defining at least one transverse beam that divides the receiving space at least partially into a first region and a second region;
at least one battery module arranged at least one of in the first region and in the second region; and a positioning arrangement disposed in a region of a connection site between the first housing part and the second housing part, the positioning arrangement facilitating alignment and connection of the first housing part and the second housing part.

20. The accumulator arrangement according to claim 19, wherein:
the positioning arrangement includes a plurality of tooth elements and a plurality of receiving elements configured to receive the plurality of tooth elements;
the plurality of tooth elements are arranged on one of the first transverse beam part and the second transverse beam part; and
the plurality of receiving elements are structured and arranged in a complimentary manner to the plurality of tooth elements on the other of the one of the first transverse beam part and the second transverse beam part.

* * * * *